United States Patent [19]

Berkstresser et al.

[11] Patent Number: 4,894,583
[45] Date of Patent: Jan. 16, 1990

[54] DISPLAY DEVICES WITH YTTRIUM ORTHOSILICATE PHOSPHORS

[75] Inventors: George W. Berkstresser, Bridgewater; Charles D. Brandle, Jr., Basking Ridge; Joseph Shmulovich, New Providence; Alejandro J. Valentino, Colonia, all of N.J.

[73] Assignee: American Telephone and Telegraph Company, AT&T Bell Laboratories, Murray Hill, N.J.

[21] Appl. No.: 239,715

[22] Filed: Sep. 2, 1988

Related U.S. Application Data

[62] Division of Ser. No. 885,229, Jul. 14, 1986, abandoned.

[51] Int. Cl.[4] ............................................. C09K 11/79
[52] U.S. Cl. .............................. 313/468; 252/301.4 F
[58] Field of Search ................... 252/301.4 F; 313/468

[56] References Cited

U.S. PATENT DOCUMENTS

| | | | |
|---|---|---|---|
| 3,715,611 | 2/1973 | Hyman et al. | 252/301.4 F |
| 3,758,413 | 9/1973 | Peters | 252/301.4 F |
| 3,814,967 | 6/1974 | Takata et al. | 252/301.4 F |
| 4,647,781 | 3/1987 | Takagi et al. | 252/301.4 F |

OTHER PUBLICATIONS

Watanabe et al., "Chem. Abstr.", vol. 89, 1978, 189878u.
Bondar et al., "Izvestia Akademia Nauk SSSR", vol. 33, No. 6, pp. 1057–1061, Physica Series, 1969.

Primary Examiner—Jack Cooper
Attorney, Agent, or Firm—Walter G. Nilsen

[57] ABSTRACT

Certain yttrium orthosillicate phosphors doped with various rare-earths are particularly suitable for use in various display devices including cathode ray tubes. Included are single crystal phosphors which exhibit high brightness and long life under high energy excitation and conventional powder phosphors with great sensitivity.

4 Claims, 3 Drawing Sheets

DISPLAY DEVICES WITH YTTRIUM ORTHOSILICATE PHOSPHORS

This application is a division of application Ser. No. 885,229, filed July 14, 1986, now abandoned.

TECHNICAL FIELD

The invention involves display devices utilizing single crystal phosphors. In particular, the single crystal phosphors are rare-earth doped yttrium orthosilicate.

BACKGROUND OF THE INVENTION

Display devices, including visual display devices, play an important part in modern technology and commercial devices available to the public. Typical display devices are cathode ray tubes for use in television sets, tubes used as monitors or in projection television tubes. Also of commercial importance are x-ray imaging devices in which typically x-ray radiation is converted into visible radiation. Phosphors are used to convert various kinds of energy, particularly electromagnetic radiation energy and electron beam energy into radiation in the visible region or radiation region directly adjacent to the visible region such as the infrared region or ultraviolet region.

Cathode ray tubes (CRTs) are especially useful in display devices. They are extensively used in direct view and projection television sets, monitors for computer terminals, television and avionics systems, etc. In many applications (such as projection tubes), high image brightness is required which can only be obtained by the use of a very high power density electron beam. Such high power densities often degrade conventional cathode ray tubes and therefore limit the lifetime of high intensity cathode ray tubes.

A significant advance in the development of high intensity cathode ray tubes was the discovery that certain luminescent epitaxial garnet films on single crystal substrates could withstand much higher power densities than with powder phosphors without tube degradation (see, for example, J. M. Robertson et al., *Applied Physics Letters*, 37(5), pp. 471-472, Sept. 1, 1980). Several systems were examined using yttrium aluminum garnet as the substrate and various activators in yttrium aluminum garnet as the epitaxial layers. The activators examined were Tb, Eu, Pr, Tm and Ce. The epitaxial layers were grown by liquid phase epitaxy using a $PbO-B_2O_3$ flux.

These types of fluorescent screens did indeed withstand much higher electron power densities than conventional screens and maintained their performance without long term degradation. Therefore, it is highly desirable to find single crystal phosphors with high efficiency, high saturation levels, and colors comparable with those colors used in color television tubes. Phosphors with high efficiency are desirable because less exciting energy is needed to produce a useful phosphor output. High saturation levels produce phosphors with high dynamic ranges without saturation effects.

A number of *powder* phosphors have been made by solid state reaction. Some have been described in a paper entitled "Solid Solutions in the $Y_2SiO_5-Y_2GeO_5$ System" by N. A. Toropor et al, Izvestiya Akademii Nauk SSSR, Neorpanicheskie Materialy, Vol. 5, No. 2, pp. 321-324 (February 1969). A paper by T. E. Peters entitled "Cathodoluminescent $Ln_y(SiO_2)_x$: Tb Phosphors "*Journal of the Electrochemical Society: Solid/State Science*, 116, No. 7, pp. 985-989 (July 1969), discloses powder luminescence in a number of powders including Tb doped $Y_2SiO_5$. Crystallographic data on single crystal $Y_2SiO_5$ is given in a paper by L. A. Harris et al. entitled "Crystallographic Data for $Er_2SiO_5$ and $Y_2SiO_5$", *American Mineralogist*, 50, pp. 1493-1495 (1965).

Synthesis of single crystals of $Y_2SiO_5$ is described in number of references. A. M. Morozov et al, in a paper published in *Optical Spectroscopy*, Vol. 41, No. 6, pp. 641-642 (December 1976) describes synthesis of small crystallites of $Y_2SiO_5$ by the Verneuil method and measurement of the luminescence and stimulated emission of holmium doped $Y_2SiO_5$. Also described in the literature is certain crystallographic measurements on single crystals of $Y_2SiO_5$ made by hydrothermal crystallization in the system $K_2O-Y_2O_3-SiO_2-H_2O$ at 450° C. and about 1500 atm.

SUMMARY OF THE INVENTION

The invention is a display device comprising certain crystalline and powder phosphors in which the host crystal for the phosphor is yttrium orthosilicate and the activator ion is one or more rare-earth ions. The display device typically comprises an excitation source and a viewing screen comprising the single crystal phosphor or powder phosphor. Particularly useful is a cathode ray tube with single crystal phosphor as part of the faceplate. Typical rare-earth ions used in the single crystal phosphor are gadolinium, terbium, europium, cerium, praseodymium, erbium, thulium and ytterbium. Effective concentrations vary with the rare-earth ion or ions involved but are generally between 0.05 and 25.0 mole percent. The mole percent refers to mole percent of yttrium in the crystal. With some rare-earths and combination of rare-earth ions, energy transfer mechanisms may be responsible for enhanced brightness of the phosphor. The single crystal faceplate may be partially or entirely doped with the dopant making up the phosphor or a thin layer of phosphor attached to a single crystal faceplate. The single crystal may be yttrium orthosilicate or other (often more available) crystal or substance. Such display devices are highly sensitive, yield high brightness with minimum excitation, have high saturation levels and are easily fabricated.

Also included in the invention are display devices (particularly CRTs) of conventional design (typically all glass) in which the rare-earth doped yttrium orthosilicate is in powder form advantageously made by solid-state reaction.

DETAILED DESCRIPTION

The invention is based on the discovery that yttrium orthosilicate when suitably doped with certain rare-earth ions or combinations of rare-earth ions have extraordinary good phosphor and cathodoluminescence characteristics for use in display devices such as x-ray imaging devices and cathode ray tubes.

Figure 1:
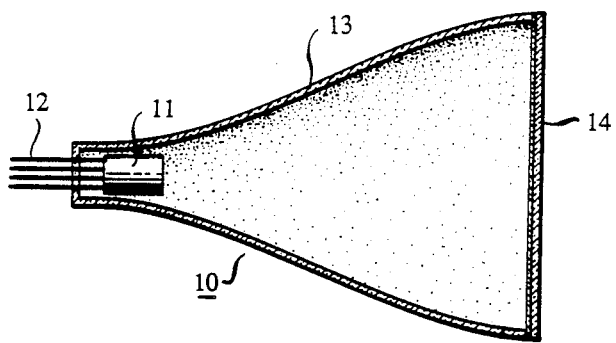
FIG. 1 shows a schematic cross-sectional view of a cathode ray tube.

A typical cathode ray tube is shown in FIG. 1. The cathode ray tube 10 is made up of an electron radiation source, 11, with means for electrical connection to outside source of electrical signal 12, an enclosure usually made of glass 13 and a single crystal screen 14. Generally, means is provided for deflecting a beam of electrons and varying the amplitude of the electron beam.

Particularly useful in understanding the invention is a description of several phosphor compositions useful in display devices. The host material in all of these phosphor materials is yttrium orthosilicate ($Y_2SiO_5$). The dopants are all rare-earth ions—some useful for their fluorescent or cathodoluminescent characteristics (color, wavelength of output, etc.) and some useful for their characteristic of modifying or enhancing the fluorescence or cathodoluminescence of another rare-earth ion dopant. Use of display devices, especially CRTs with such phosphors is highly advantageous because of high light output, large dynamic range and ease of fabrication.

A number of typical phosphors are described below:

1. Gadolinium doped yytrium orthosilicate with preferred concentration range between about 0.3 and 25.0 mole percent and most preferred concentration range between 0.5 and 5.0 mole percent. This phosphor emits a very narrow, (3–4 nm) strong line in the U.V. (317 nm) which is useful for a variety of applications including energy transfer in phosphors and as a U.V. source for exposing photoresist in integrated circuit fabrication.

2. Terbium doped $Y_2SiO_5$ with preferred concentration range of 1.0 to 15.0 mole percent and a most preferred range of 4.0 and 10.0 mole percent. This phosphor emits at about 550 nm (green) and also has an extremely strong phosphorescence output.

Figure 2:
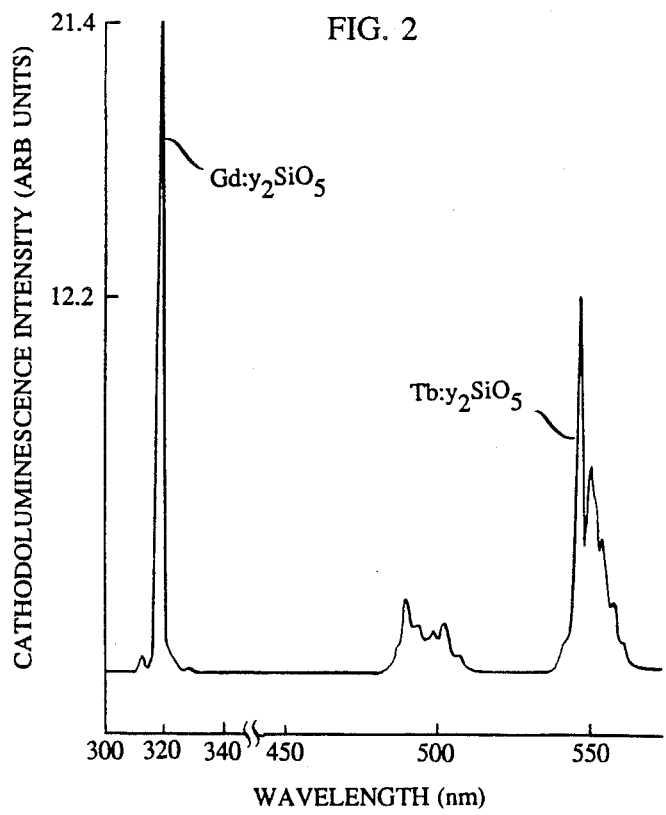
FIG. 2 shows the cathodoluminescence output of gadolinium doped yttrium orthosilicate and terbium doped yttrium orthosilicate.

FIG. 2 shows the spectral output of Gd:$Y_2SiO_5$ and Tb:$Y_2SiO_5$ under identical excitation conditions using electron beam excitation. The extremely narrow linewidth of the Gd:$Y_2SiO_5$ phosphor yields a brightness about 75 percent greater than the Tb:$Y_2SiO_5$ phosphor. The concentration of Gd is 2.8 mole percent; the concentration of Tb is 8.5 mole percent.

3. Gadolinium and terbium doped yttrium orthosilicate. This phosphor emits in the green region and is slightly more efficient than terbium alone. Preferred concentration range is 5.0 to 15.0 mole percent for terbium and 0.1 to 10.0 mole percent for gadolinium with 5.0 to 10.0 mole percent most preferred for terbium and 2.5 to 7.5 mole percent most preferred for gadolinium.

4. Cerium doped yttrium orthosilicate with preferred concentration range from 0.05 to 1.5 mole percent with 0.1 to 1.0 mole percent most preferred. This phosphor emits strongly in the blue under electron excitation. It is approximately 10 times brighter than the best blue garnet phosphor known.

Figure 3:
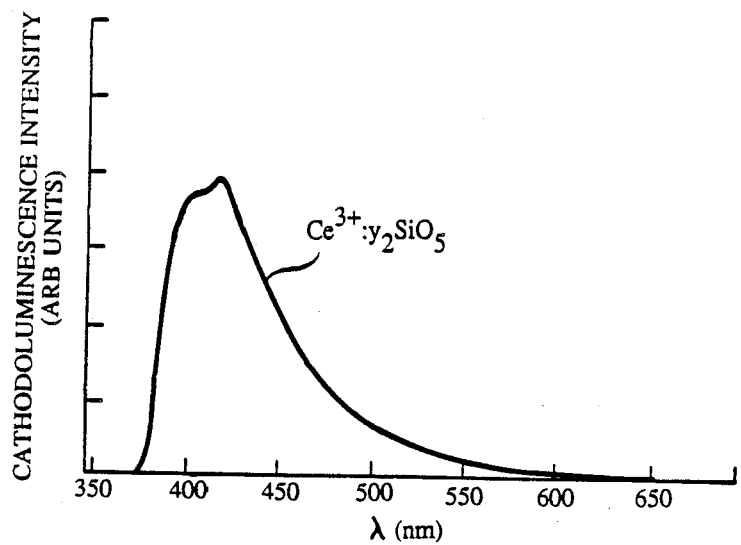
FIG. 3 shows the cathodoluminescence output of cerium doped yttrium orthosilicate.

FIG. 3 shows a graph of cathodoluminescence of cerium doped yttrium orthosilicate, showing its strong output in the blue region.

5. Cerium and terbium doped yttrium orthosilicate with preferred concentrations between 0.1 and 1.0 mole percent for cerium and 5.0 and 15.0 mole percent for terbium. This phosphor emits light in the green with essentially no blue emission. It is an ideal phosphor for a television tube. Most preferred concentrations are from 0.12 to 1.0 mole percent cerium and 5.0 to 10.0 mole percent terbium.

6. Gadolinium and cerium doped yttrium orthosilicate. This phosphor emits in the blue part of the visible spectrum and the presence of gadolinium considerably increases the output of the phosphorescence. Preferred concentrations are 0.1 to 0.5 mole percent cerium, 0.1 to 20.0 mole percent gadolinium with 0.1 to 0.35 mole percent cerium and 0.5 to 5.0 mole percent gadolinium most preferred.

7. Europium and terbium doped yttrium orthosilicate. This phosphor emits strongly in the red without significant green output and is useful for monitor CRTs as well as color television tubes. Preferred concentrations are 5.0 to 7.5 mole percent terbium and 0.1 to 15.0 mole percent europium with 1.0 to 3.5 mole percent terbium and 5.0 to 10.0 mole percent europium most preferred.

Figure 4:
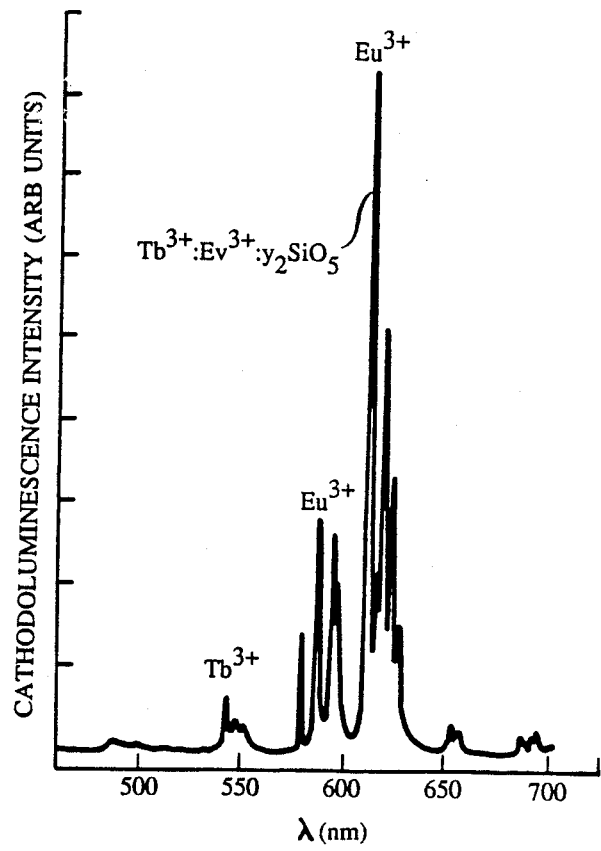
FIG. 4 shows the cathodoluminescence output of terbium and europium doped yttrium orthosilicate.

FIG. 4 shows the cathodoluminescence output of a yttrium orthosilicate crystal doped with terbium and europium. The addition of terbium enhances the output of europium presumably by an energy-transfer mechanism.

The single crystal phosphor materials can be made in a variety of ways including cooling a melt comprising $Y_2SiO_5$ and the rare-earth dopant or dopants.

Figure 5:
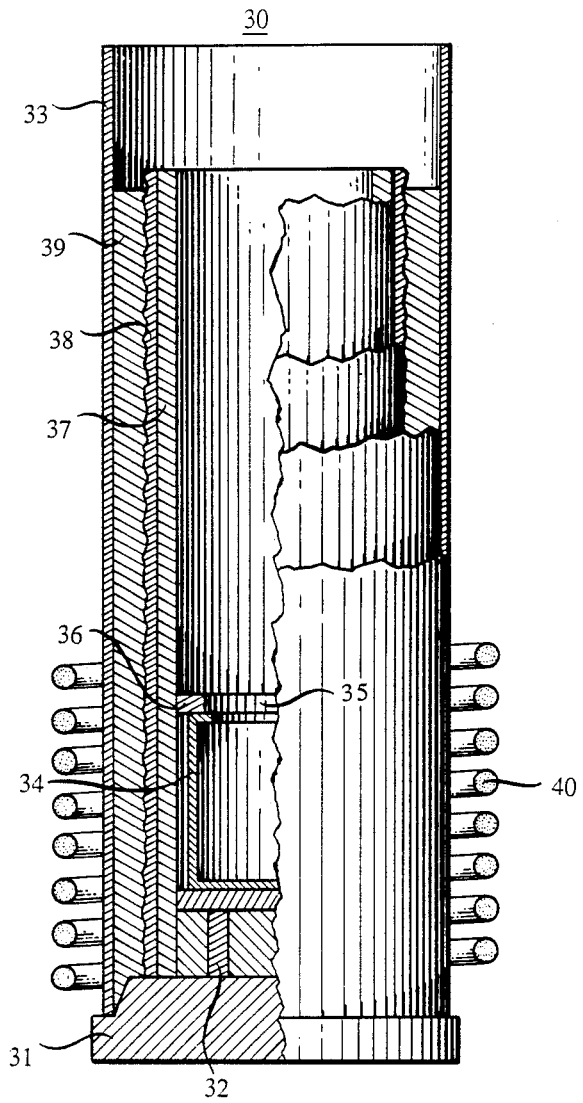
FIG. 5 shows a diagram of an apparatus useful for the growth of yttrium orthosilicate crystals.

A particularly convenient method of growing these crystals are by the Czochralski technique. A particularly convenient apparatus for growth is shown in FIG. 5. This apparatus is made up of a $ZrO_2$ base 31, $ZrO_2$ supports 32 and an outside quartz tube 33. Inside the quartz tube 33 are the iridium crucible 34, an iridium lid 35 for the iridium crucible 34, a $ZrO_2$ ring 36 and tube 37 structure and further thermal insulation made of $ZrO_2$ felt 38 and $ZrO_2$ granular material 39. During operation, the phosphor material is contained in the crucible at a temperature above its melting temperature and a rotating rod with a crystalline seed is used to grow a crystal out of the melt. Heating is accomplished by means of an RF coil 40 surrounding the growth apparatus.

For all crystal growth tests, a minimum purity of 99.99% was used for both the rare-earth oxides and the $SiO_2$. All rare-earth oxides were fired at 1100° C. for 12 hours prior to use to insure a moisture and $CO_2$ free powder. The powders were then weighed and mixed in a 1:1 stoichiometric ratio and isostaticly pressed into a cylinder which was then loaded into the crucible. The melting points for the various materials were measured using an optical pyrometer uncorrected for emissivity.

Typical growth conditions for $Y_2SiO_5$ are as follows: The charge weight is about 280 grams and the melting point about 2070° C. The weight of the crystal is about 100–200 grams, the diameter about 2.0 cm and the length about 6–8 cm. The pull rate is about 3.8 mm/hour and the rotation rate about 20 RPM. Growth direction can be varied.

Particularly advantageous in the practice of the invention are cathode ray tubes with single crystal $Y_2SiO_5$ as the faceplate. The $Y_2SiO_5$ may be doped with the rare-earth to make up a large single crystal phosphor or the single crystal faceplate undoped and a phosphor layer attached to the back (inside) of the faceplate. Also useful is a faceplate made of another single crystal material and the single crystal $Y_2SiO_5$ attached to the inside face of the faceplate.

In order to fabricate a CRT using $Y_2SiO_5$ single crystal faceplate, the single crystal must be sealed to the CRT tube glass. This sealing operation is typically done by frit sealing or direct fusion to the glass.

The thermal expansion of crystal $Y_2SiO_5$ is highly anisotropic; and, to insure good attachment to the glass CRT structure, it is highly advantageous to find a crystal plane orientation of the $Y_2SiO_5$ crystal where the thermal expansion in the plane is uniform. This involves accurate determination of the tensor elements of the thermal expansion coefficient of $Y_2SiO_5$. To perform this task it was necessary to accurately determine the lattice parameters of the $Y_2SiO_5$ crystal, then orient small crystals which were then used as seeds for Czochralski growth. From larger crystals grown with a known orientation, parts were then fabricated for thermal expansion coefficient measurements.

To determine the lattice constant of $Y_2SiO_5$, a sample of the Czochralski grown crystal was crushed in an alumina vial and ball shaker mill. A powder diffraction x-ray camera was used to obtain the diffraction pattern, then the data was analyzed to determine statistically significant diffraction peaks and these peaks indexed. The values of the lattice parameters for the C-face-centered unit cell obtained from the powder diffraction measurements are $a=14.3797$ Å, $b=6.7180$ Å, $c=10.4077$ Å, and $\beta=122.19°$. Initially attempts were made to use Laue back reflection diffraction patterns for orientation of $Y_2SiO_5$ single crystals, but the very low symmetry of this monoclinic structure resulted in the effort being unsuccessful since unique patterns could not be recognized. Therefore, the use of Burger precession camera photographs was employed to determine the orientation of small pieces cut from the Czochralski grown material. Wafers were cut to prepare discs of $Y_2SiO_5$ having the a and c axis in the plane of the wafer. Changing the temperature of a crystal will result in a deformation which may be specified by the strain tensor $[\epsilon_{ij}]$ that is proportional to the temperature change $\Delta T$. The proportionality constant for each of these tensors is $[\alpha_{ij}]$, the thermal expansion coefficient. Selecting $Ox_2$ to be in the <010> direction, the thermal expansion coefficient may be expressed by:

$$\alpha = \begin{bmatrix} \alpha_{11} & 0 & \alpha_{31} \\ 0 & \alpha_{22} & 0 \\ \alpha_{31} & 0 & \alpha_{33} \end{bmatrix} \quad (1)$$

The directions of the two principle axes normal to $Ox_2$ may be chosen arbitrarily. We have found it to be more useful to select the $Ox_3$ axis to be in the direction of the <001> or $c^*$ reciprocal lattice direction since this is what is convenient to observe by x-ray diffraction techniques. The $Ox_1$ direction is thus defined by our selection of $Ox_3$.

The expansion in the $Ox_2$ direction is a maximum or a minimum, and so it is not sensitive to small misorientation of the crystal. We may then satisfactorily measure $\alpha_{22}$ by preparation of samples with faces normal to the $b^*$ direction. The tensors $\alpha_{11}$ and $\alpha_{33}$ are sensitive to small rotations about $Ox_2$, i.e., the <010>, and any errors in the alignment of the samples used to measure expansion parallel to $Ox_1$ and $Ox_3$ will be significant. A procedure for minimization of these errors has been described by Nye (J. F. Nye, Physical Properties of Crystals, Oxford University Press, London (1957)) which involves the measurement of the expansion in numerous directions normal to the <010> axis.

The results on two crystals from which parts were fabricated for <010> expansion measurement are listed in Table 1, where at 300° C. the magnitude was $7.5 \times 10^{-6}$ cm$^{-1}$. The data for samples cut from the plane defined by the <100> and <001> planes are found in Table 2, where the magnitude ranges from $1 \times 10^{-6}$ cm$^{-1}$ to $11 \times 10^{-6}$ cm$^{-1}$. Reduction of the data using the procedure described by Nye, yields value of the principle axes of $\alpha_1=0.50$, $\alpha_3=11.5$, and $\phi=-7.15°$ from the $c^*$ direction. Values of the thermal expansion tensor elements are: $\alpha_{11}=0.67$, $\alpha_{31}=\alpha_{13}=-1.36$, and $\alpha_{33}=11.36$.

The thermal expansion coefficient magnitude may be described by an ellipsoid surface in three dimensional space. A CRT faceplate of uniform in-plane thermal expansion determines the orientation where the points of intersection of a plane and the ellipsoid define a circle. This condition occurs only for one magnitude of thermal expansion coefficient, the median of the principle axis values. Therefore, to prepare the $Y_2SiO_5$ faceplate one must determine the orientation of a plane which contains both the above principle axis and a normal to this axis in which the thermal expansion coefficient has the same magnitude.

To prepare the $Y_2SiO_5$ faceplates the crystals are to be cut parallel to a plane defined by the <010> axis and its normal which lies either 30° or 135° from $c^*$, where a positive angle is measured towards $a^*$. Such plates can be cut from any $Y_2SiO_5$ crystal for which the orientation is known, but to prepare nearly circular disc during the cutting process the $Y_2SiO_5$ crystal should be grown in a direction which is parallel to the normal of the cutting plane. Precise orientation of the bulk crystals will always be necessary. We examined the structure of the $Y_2SiO_5$ and found a fairly strong x-ray diffraction intensity from the <$\bar{6}04$> direction. This crystallographic direction lies normal to the <010> and at $-95.34°$ from the plane required for the CRT faceplates. The Czochralski crystals may then be oriented along the <$\bar{6}04$> rotated to bring the <010> to be vertical; and then turned 5.34° counterclockwise to orient for faceplate slicing.

The selection of glass for fabrication of the CRT tube depends on the thermal expansion of the single crystal $Y_2SiO_5$ oriented for isotropic thermal expansion in the plane of the faceplate as described above. Any glass suitable for use in a CRT and with the required thermal expansion can be used. Particularly useful is SBW glass.

These phosphors are also of use in conventional cathode ray tubes in which a powder is attached to the inside surface of the cathode ray tube. These powders are conventionally made by solid state reaction where the component oxides (yttrium oxide and silicon oxide in the case of yttrium orthosilicate) plus the desired rare-earth oxides are thoroughly mixed together and reacted generally at a temperature below their melting point. The powders used in the fabrication of the conventional cathode ray tube generally have small particle size.

The conventional cathode ray tube is generally made of glass in which the phosphor powder is attached to the inside surface of the faceplate by allowing a water slurry of said phosphor powder to settle on the inside surface of the faceplate and then decanting off the excess liquid. The faceplate is then fired to dry the powder, covered with a lacquer, and then aluminized to provide the electrode necessary for operation of the cathode ray tube. The lacquer is baked off to provide the final surface of the faceplate. Typical powder phosphors made for such an application are as follows:

1. Gadolinium doped yttrium orthosilicate with preferred concentration range between about 0.3 and 25.0 mole percent and most preferred concentration range between 0.5 and 5.0 mole percent. This phosphor emits a very narrow strong line in the U.V. which is useful in a variety of applications, including energy transfer in phosphors and as a U.V. source for exposing photoresist in integrated circuit fabrication.

2. Gadolinium and terbium doped yttrium orthosilicate. This phosphor emits in the green range and is slightly more efficient than terbium alone. Preferred concentration range is 5.0 to 15.0 mole percent for terbium and 0.1 to 10.0 mole percent for gadolinium with 5.0 to 10.0 mole percent most preferred for terbium and 2.5 to 7.5 mole percent most preferred for gadolinium.

3. Gadolinium and cerium doped yttrium orthosilicate. This phosphor emits in the blue part of the visible spectrum, and the presence of gadolinium considerably increases the output of the phosphorescence. Preferred concentrations are 0.1 to 0.5 mole percent cerium, 0.1 to 20.0 mole percent gadolinium, with 0.1 to 0.35 mole percent cerium and 0.5 to 5.0 mole percent gadolinium most preferred.

4. Europium and terbium doped yttrium orthosilicate. This phosphor emits strongly in the red without significant green output and is useful for monitoring CRTs as well as color television tubes. Preferred concentrations are 5.0 to 7.5 mole percent terbium and 0.1 to 15.0 mole percent europium with 1.0 to 3.5 mole percent terbium and 5.0 to 10.0 mole percent europium most preferred.

What is claimed is:

1. Display device comprising a cathode ray tube, said cathode ray tube comprising:
   a. excitation source comprising a beam of electrons;
   b. screen comprising phosphor;
   c. means for electrical connection to outside source of electrical signal;
   d. enclosure attached to the screen;
   in which the phosphor comprises yttrium orthosilicate doped with europium and terbium trivalent ions with concentrations of each ion between 0.05 and 25.0 mole percent of the yttrium and in which the output of the europium ions is increased by the presence of terbium ions.

2. The device of claim 1 in which the concentration of terbium is between 5.0 and 7.5 mole percent and the concentration of europium is between 0.1 and 15.0 mole percent.

3. The device of claim 2 in which the concentration of terbium is between 1.0 and 3.5 mole percent and the concentration of europium is between 5.0 and 10.0 mole percent.

4. The device of claim 1 in which the powder phosphor is made by solid state reaction from the appropriate oxides.

* * * * *